United States Patent
Yan et al.

(10) Patent No.: US 9,759,885 B2
(45) Date of Patent: Sep. 12, 2017

(54) LENS MODULE

(71) Applicants: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(72) Inventors: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(73) Assignee: AAC ACOUSTIC TECHNOLOGIES (SHENZHEN) CO., LTD, Shenzhen (CN)

( * ) Notice: Subject to any disclaimer, the term of this patent is extended or adjusted under 35 U.S.C. 154(b) by 203 days.

(21) Appl. No.: 14/645,782

(22) Filed: Mar. 12, 2015

(65) Prior Publication Data
US 2015/0260943 A1 Sep. 17, 2015

(30) Foreign Application Priority Data
Mar. 14, 2014 (CN) .................... 2014 2 0123593 U (51) Int. Cl.
| | |
|---|---|
| G02B 9/34 | (2006.01) |
| G02B 7/02 | (2006.01) |
| G02B 7/00 | (2006.01) |
| G02B 13/00 | (2006.01) |

(52) U.S. Cl.
CPC ............. *G02B 7/021* (2013.01); *G02B 7/003* (2013.01); *G02B 7/022* (2013.01); *G02B 13/004* (2013.01)

(58) Field of Classification Search
CPC ........ G02B 7/021; G02B 7/022; G02B 7/003; G02B 13/004; G02B 9/34; B29C 66/304; B29C 66/54; B29C 66/543; H04N 5/2254
See application file for complete search history.

(56) References Cited

U.S. PATENT DOCUMENTS

| | | | | |
|---|---|---|---|---|
| 2006/0018036 | A1* | 1/2006 | Huang | G02B 3/00 359/694 |
| 2006/0140623 | A1* | 6/2006 | Yu | G02B 7/021 396/529 |
| 2009/0015945 | A1* | 1/2009 | Chen | G02B 7/021 359/819 |
| 2013/0027788 | A1* | 1/2013 | Yen | G02B 13/0045 359/763 |

(Continued)

*Primary Examiner* — Bumsuk Won
*Assistant Examiner* — Balram Parbadia
(74) *Attorney, Agent, or Firm* — Na Xu; IPro, PLLC (57) ABSTRACT

A lens module includes a lens supporter, and a lens group received by the lens supporter. The lens supporter includes an aperture plate, a main body extending downwardly from the aperture plate and a receiving space formed by the aperture plate and the main body, the aperture plate having a light aperture, the main body having an internal surface facing the receiving space. The lens group includes a first lens abutting against the aperture plate for forming a first alignment accuracy, a second lens stacked on the first lens and keeping a distance from the internal surface of the main body, a third lens stacked on the second lens and keeping a distance from the internal surface of the main body, and a fourth lens stacked on the third lens and abutting against the internal surface of the main body.

18 Claims, 4 Drawing Sheets

(56) References Cited

U.S. PATENT DOCUMENTS

2013/0050850 A1* 2/2013 Lin .................. G02B 7/021
359/738
2014/0029114 A1* 1/2014 Kim .................. G02B 3/08
359/709

* cited by examiner

LENS MODULE

FIELD OF THE INVENTION

The present invention relates to a lens module with lens group, particularly to a miniature lens module applicable to a camera module or a photographing module in a mobile device, such as a tablet PC, a mobile phone, or a personal digital assistant (PDA) and etc.

DESCRIPTION OF RELATED ART

With the rapid development of technologies, electronic devices having image pick-up functions, such as cameras, mobile phones, portable computers, tablets, are equipped with lens modules. For satisfying the demands of high quality pictures, lens modules are designed and manufactured with high accuracies. As one of the key characters of a lens module, concentricity is much important for performing high quality pictures.

Generally, a lens module comprises a lens supporter for receiving a plurality of lens groups therein. The lens group should be provided with high concentricity to be concentric with each other, and the combination of the lens group should be concentric with the supporter. During actual manufacturing process, the concentricity between the lens group, or between the lens group and the lens supporter is difficult to be controlled. Thus, this disclosure provides a lens module provided with a special configuration for ensuring the concentricity thereof.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
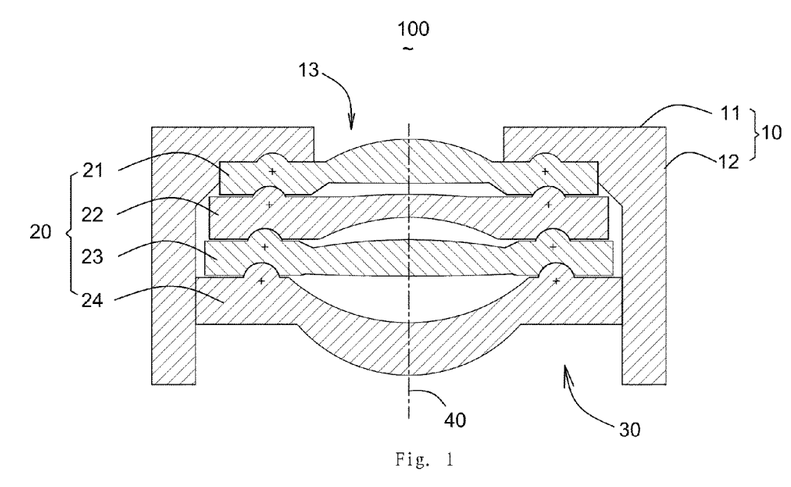
FIG. 1 is an illustrative cross-sectional view of a lens module in accordance with an first exemplary embodiment of the present disclosure.
Figure 2:
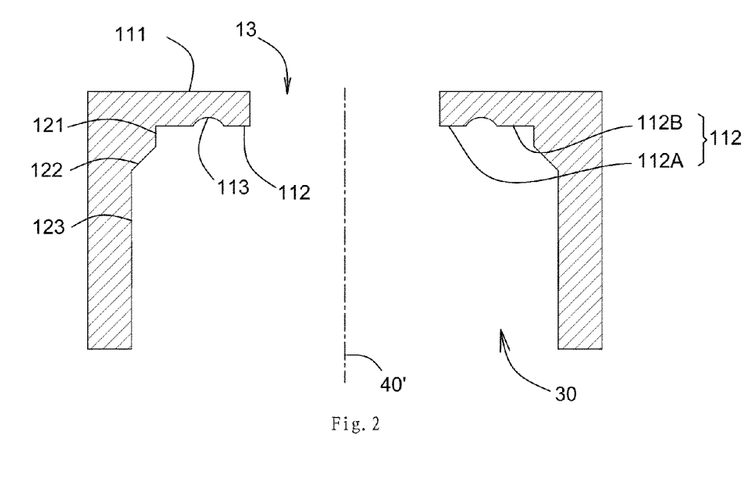
FIG. 2 is an illustrative cross-sectional view of a lens supporter of the lens module in FIG. 1.

The present invention will hereinafter be described in detail with reference to exemplary embodiments. The first exemplary embodiment of the present disclosure provides a lens module that could be used in a mobile phone, a tablet PC, or a digital camera. Referring to FIGS. 1 and 2, a lens module 100 comprises a lens supporter 10 and a lens group 20 supported by the lens supporter 10. The lens supporter 10 includes an aperture plate 11, a main body 12 extending vertically from an edge of the aperture plate 11, and a receiving space 30 formed by the aperture plate 11 and the main body 12. In this embodiment, the main body 12 is integrated with the aperture plate 11. The lens group 20 is received in the receiving space 30. The lens group 20 comprises a first lens 21, a second lens 22 stacked on the first lens 21, a third lens 23 stacked on the second lens 22, and a fourth lens 24 stacked on the third lens 23. The first lens 21 locates in the main body 12 and partially extending into the aperture plate 11. The lens group 10 has an optical axis 40. The first lens 21, the second lens 22, the third lens 23, and the fourth lens 24 are aligned sequentially along the optical axis 40.

The aperture plate 11 comprises an top surface 111, a bottom surface 112 opposite and parallel to the top surface 111, and a light aperture 13 with a central axis 40' drilled through the aperture plate 11, for passing lights into the lens supporter 10. Specifically, the light aperture 13 is a cylindrical-shaped hole drilled perpendicularly in the aperture plate 11. The bottom surface 112 of the aperture plate 11 has a first bottom surface 112A surrounding the light aperture 13, a second bottom surface 112B connecting to the main body 12, and a first engaging portion 113 connecting the first bottom surface 112A with the second bottom surface 112B and surrounding the central axis 40'. Therefore, the first bottom surface 112A, the first engaging portion 113, and the second bottom surface 112B are arranged sequentially away from the central axis 40'. The main body 12 comprises an internal surface bounding the receiving space 30, including a first inner surface 121 jointing with and perpendicular to the bottom surface 112, a second inner surface 123 parallel with the first inner surface 121 and a sloping surface 122 connecting the first inner surface 121 with the second inner surface 123. The sloping surface 122 extends from the first inner surface 121 to the second inner surface 123 in a direction away from the central axis 40'. The receiving space 30 is formed by the first inner surface 121, the sloping surface 122, and second inner surface 123 and the bottom surface 112 cooperatively for receiving the lens group 20.

Referring to FIGS. 1-4, the first lens 21 comprises a first object-side surface 21A, a first image-side surface 21B opposite to the first object-side surface 21A, and a first lateral surface 21C connecting the first object-side surface 21A with the first image-side surface 21B. The first lateral surface 21C abuts against the inner surface 121 of the main body 12. The first lens 21 further has a first concave part 215 concave from the first image-side surface 21B towards the first object-side surface 21A and a second engaging portion 205 protruding from the first object-side surface 21A towards the aperture plate 11 and surrounding the optical axis 40 for engaging with the first engaging portion 113. Specifically, the first engaging portion 113 is an arc shaped groove, and the second engaging portion 205 is accordingly an arc shaped protrusion.

The first object-side surface 21A has a first connecting portion 203 connecting the first lateral surface 21C with one end of the second engaging portion 205, and a first object-side extending portion 210 connecting to the other end of the second engaging portion 205. The first object-side extending portion 210 includes a first object-side optical surface 201 arranged in a middle thereof and centered about the optical axis 40 for serving as an optical zone, and a first abutting portion 202 connecting the first object-side optical surface 201 with the second engaging portion 205. When assembled, the first bottom surface 112A abuts against the first abutting portion 202, the second bottom surface 112B abuts against first connecting portion 203, the first engaging portion 113 abuts against the second engaging portion 205, and the first lateral surface 21C at least partially abuts against the inner surface 121 of the main body 12, thereby forming a first alignment accuracy for ensuring the central axis 40' is coaxial with the optical axis 40 and the misalignment between the lens group 20 and the lens supporter 10 can be prevented. The first engaging portion 113 is a concave shape and the second engaging portion 205 is a convex shape for mating the first engaging portion 113.

Figure 3:
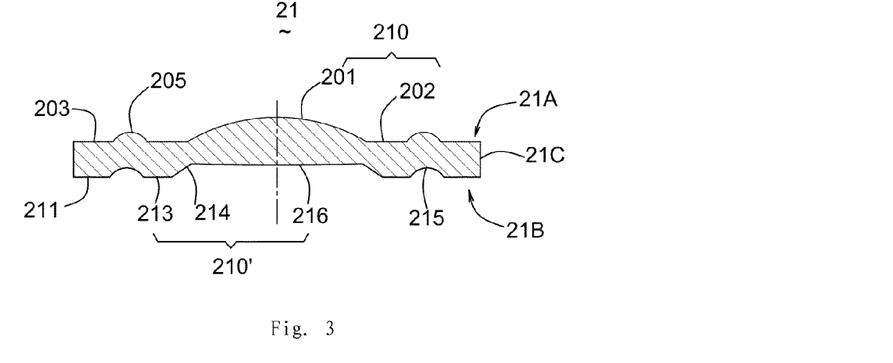
FIG. 3 is an illustrative cross-sectional view of a first lens used in the lens module in FIG. 1.
Figure 4:
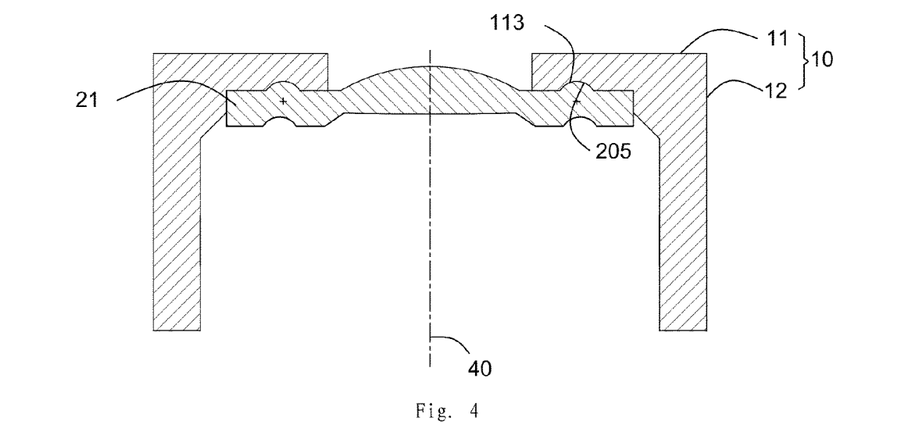
FIG. 4 is an illustrative cross-sectional view of the first lens in FIG. 3 assembled with the lens supporter in FIG. 2.

The first image-side surface 21B has a first image-side connecting portion 211 connecting the first lateral surface 21C and one end of the first concave part 215 and a first image-side extending portion 210' connecting to the other end of the first concave part 215. The first image-side extending portion 210' has a first image-side optical surface 216 arranged in the middle thereof and centered about the optical axis 40 for serving as an optical zone, a first inclining surface 214 connecting to the first image-side optical surface 216 and surrounding the optical axis 40, and a first plane 213 connecting the first concave part 215 with the first inclining surface 214.

Referring to FIGS. 3-6, the second lens 22 includes a second object-side surface 22A, an second image-side surface 22B opposite the second object-side surface 22A, and a second lateral surface 22C connecting the second object-side surface 22A and the second image-side surface 22B. The second lateral surface 22C keeps a distance from the second inner surface 123 and the sloping surface 122. The second lens 22 further has a first convex part 225 protruding from the second object-side surface 22A and away from the second image-side surface 22B for engaging with the first concave part 215 of the first lens 21 and a second concave part 224 concave from the second image-side surface 22B and towards the second object-side surface 22A. The second object-side surface 22A has a second object-side connecting portion 221 connecting the second lateral surface 22C and one end of the first convex part 225, and a second object-side extending portion 220 connecting the other end of the first convex part 225. The second object-side extending portion 220 has a second object-side optical surface 226 arranged in the middle thereof and centered about the optical axis 40 for serving as an optical zone and a second object-side plane 223 connecting the first convex part 225 and the second object-side optical surface 226.

Figure 5:
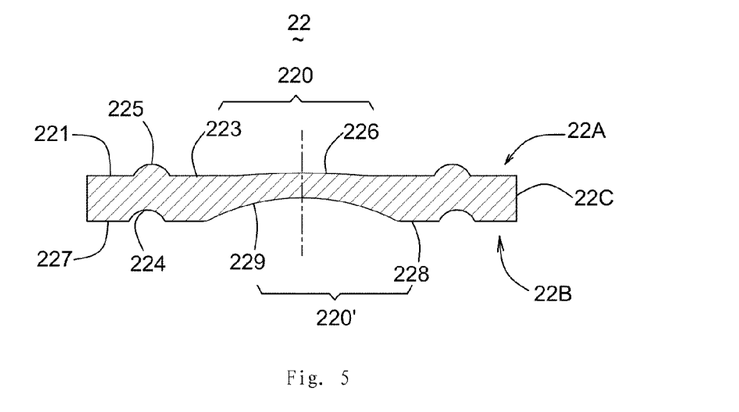
FIG. 5 is an illustrative cross-sectional view of a second lens used in the lens module in FIG. 1.
Figure 6:
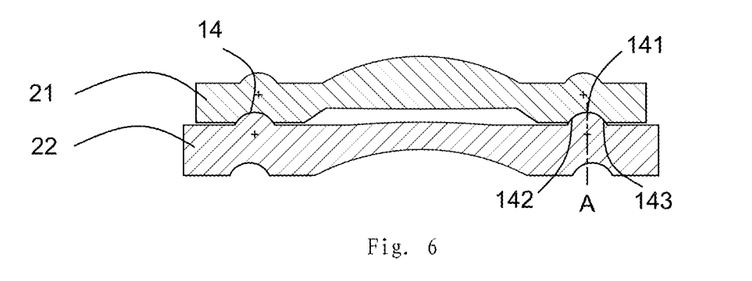
FIG. 6 is an illustrative cross-sectional view of the second lens in FIG. 5 stacked on the first lens in FIG. 3.

The second image-side surface 22B has a second image-side connecting portion 227 connecting the second lateral surface 22C with one end of the second concave part 224 and a second image-side extending portion 220' connecting to the other end of the second concave part 224. The second image-side extending portion 220' has a second image-side optical surface 229 arranged in the middle thereof and centered about the optical axis 40 for serving as an optical zone and a second image-side plane 228 connecting the second concave part 224 and the second image-side optical surface 229.

In this exemplary embodiment, the first image-side connecting portion 211 keeps a distance from the second object-side connecting portion 221, and the first image-side extending portion 210' keeps a distance from the second object-side extending portion 220. In other words, the first image-side surface 21B of the first lens 21 does not completely engage with the second object-side surface 22A of the second lens 2. Therefore, the concentricity between the first lens 21 and the second lens 22 is determined solely by the engagement between the first concave part 215 of the first lens 21 and the first convex part 225 of the second lens 2, which reduces the assembling tolerance and improves the assembling accuracy. The first concave part 215 of the first lens 21 and the first convex part 225 of the second lens 22 define a second alignment accuracy for holding the first lens 21 and the second lens 22 in a precisely coaxial relationship. The first concave part 215 of the first lens 21 engaged with the first convex part 225 of the second lens 22 accordingly forms a first jointing portion 14. The first jointing portion 14 has a first farthest curve 141 far away from the first image-side surface 21B, a first outer part 143 extending from the first farthest curve 141 towards the main body 12 and a first inner part 142 extending from the first farthest curve 141 towards the optical axis 40. The first outer part 143 and the first inner part 142 are symmetrical with a plane A passing through the first farthest curve 141 and parallel to the optical axial 40. Optionally, a distance between the first farthest curve 141 and the first image-side surface 21B determines a thickness of the first lens 21.

Referring to FIGS. 5-8, the third lens 23 comprises a third object-side surface 23A, an third image-side surface 23B opposite to the third object-side surface 23A, and a third lateral surface 23C connecting the third object-side surface 23A and the third image-side surface 23B. The third lateral surface 23C keeps a distance from the second inner surface 123. The third lens 23 further has a second convex part 235 protruding from the third object-side surface 23A and away from the third image-side surface 23B, for engaging with the second concave part 224, and a third concave part 238 concave from the third image-side surface 23B and towards the third object-side surface 23A. In this exemplary embodiment, the second concave part 224 engages with the second convex part 235, accordingly forming a second jointing portion 15. The second jointing portion 15 includes a second farthest curve 151 far away from the second image-side surface 22A, a second outer part 153 extending from the first farthest curve 151 towards the main body 12 and a second inner part 152 extending from the second farthest curve 151 towards the optical axis 40.

Figure 7:
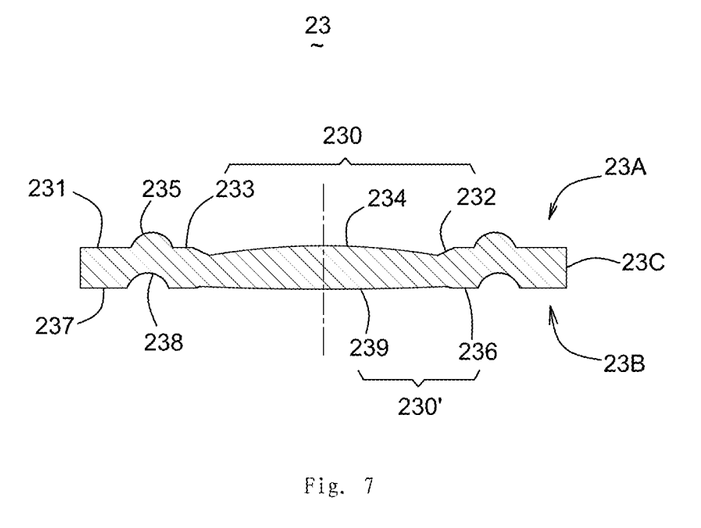
FIG. 7 is an illustrative cross-sectional view of a third lens used in the lens module in FIG. 1.
Figure 8:
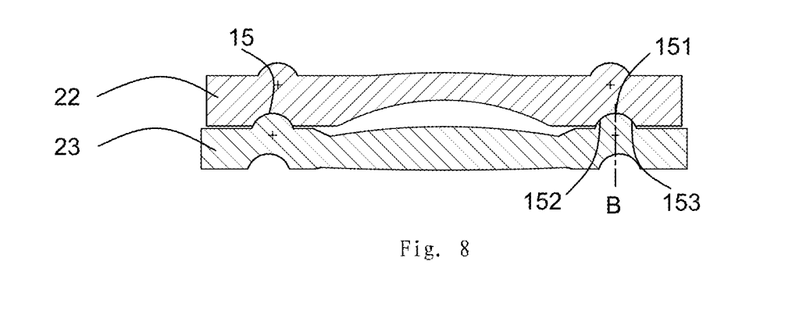
FIG. 8 is an illustrative cross-sectional view of the third lens in FIG. 7 stacked on the second lens in FIG. 5.

The third object-side surface 23A has a third object-side connecting portion 231 connecting the third lateral surface 23C with one end of the second convex part 235 and a third object-side extending portion 230 connecting to the other end of the second convex part 235. The third object-side extending portion 230 includes a third object-side optical surface 234 arranged in the middle thereof and centered about the optical axis 40 for serving as an optical zone, a third object-side inclining surface 232 extending from the third object-side optical surface 234 and away from the third image-side surface 23A and a third object-side plane 233 connecting the second convex part 235 with the third object-side inclining surface 232. The third image-side surface 23A has a third image-side connecting portion 237 connecting the third lateral surface 23C and one end of the third concave part 238 and a third image-side extending portion 230' connecting to the other end of the third concave part 238. The third image-side extending portion 230' includes a third image-side optical surface 239 arranged in the middle thereof and centered about the optical axis 40, for serving as an optical zone, and a third image-side plane 236 connecting the third concave part 238 with the third image-side optical surface 239.

The second image-side connecting portion 227 keeps a distance from the third object-side connecting portion 231 and the second image-side extending portion 220' keeps a distance from the third object-side extending portion 230. Therefore, upon assembly, the concentricity between the second lens 22 and the third lens 23 is determined solely by the engagement between the second concave part 224 of the second lens 22 and the second convex part 235 of the third lens 23, which reduces the assembling tolerance and improves the assembling accuracy.

Referring to FIGS. 7-10, the fourth lens 24 comprises a fourth object-side surface 24A, an fourth image-side surface 24B opposite to the fourth object-side surface 24A, and a fourth lateral surface 24C connecting the fourth object-side surface 24A with the fourth image-side surface 24B. The fourth lateral surface 24C abuts against the second inner surface 123 of the main body 12, for ensuring the central axis 40' is coaxial with the optical axis 40. The fourth lens 24 further has a third convex part 245 protruding from the fourth object-side surface 24A and away from the fourth image-side surface 24B, for engaging with the third concave part 238. In this exemplary embodiment, the third concave part 238 engages with the third convex part 245, accordingly forming a third jointing portion 16. The third jointing portion 16 include a third farthest curve 161 far away from the third image-side surface 24B, a third outer part 163 extending from the third farthest curve 161 towards the main body 12, and a third inner part 162 extending from the third farthest curve 161 towards the optical axis 40.

Figure 9:
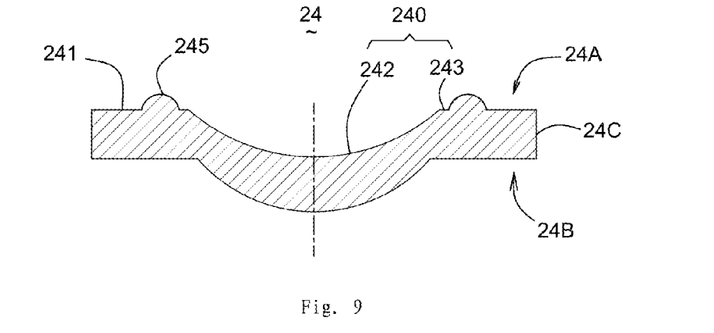
FIG. 9 is an illustrative cross-sectional view of a fourth lens used in the lens module in FIG. 1.
Figure 10:
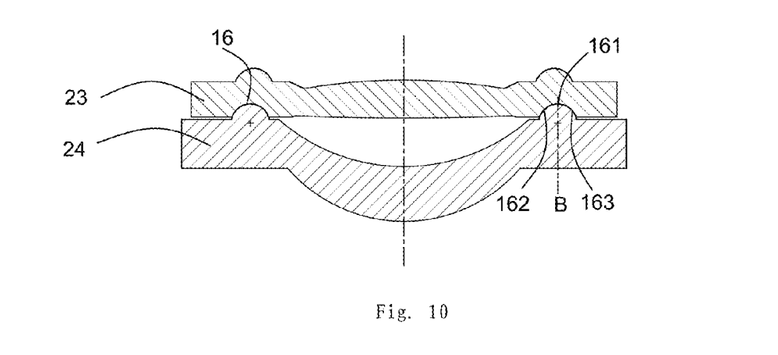
FIG. 10 is an illustrative cross-sectional view of the fourth lens in FIG. 9 stacked on the third lens in FIG. 7.

The fourth object-side surface 24A has a fourth object-side connecting portion 241 connecting the fourth lateral surface 24C with one end of the third convex part 245 and a fourth object-side extending portion 240 connecting to the other end of the third convex part 245. The fourth object-side extending portion 240 has a fourth object-side optical surface 242 arranged in the middle thereof and centered about the optical axis 40 for serving as an optical zone, and a fourth object-side plane 243 connecting the third convex part 245 with the fourth object-side optical surface 242. The third image-side connecting portion 237 keeps a distance from the fourth object-side connecting portion 241 and the third image-side extending portion 230' keeps a distance from the fourth object-side extending portion 240. Therefore, the concentricity between the third lens 23 and the fourth lens 24 is determined solely by the engagement between the third concave part 238 and the third convex part 245, which reduces the assembling tolerance and improves the assembling accuracy.

Outlines of the concave parts 215, 224, 238 and the convex parts 225, 235, 245 are respectively configured to be a part of a circle for ensuring the concentricity between the lens group. In other words, the outlines of the convex parts 225, 235, 245 and the concave parts 215, 224, 238 are shaped as circular arc. The farther curves 141, 151, 161 are farther from the corresponding image-side surface 21B, 22B, 23B than other portion of the jointing portions 14, 15, 16 for placing the outer parts 143, 153, 163 and the inner part 142, 152, 162 on two sides of the corresponding farther curves 14, 15, 16 respectively, thereby the concentricity between the lens group 20 is effectively enhanced, and the misalignment of the lens group 20 can be prevented.

Optionally, heights between the farthest curves 141, 151, 161 and the corresponding image-side surfaces 21B, 22B, 23B can be changed according to different requirements. The concave parts may be interchanged with the corresponding convex parts, for example, the concave part provided on the first lens may be interchanged with the first convex part provided on the second lens. Similarly, the shape of the first and second engaging portions may be in variety, as long as the first engaging portion is shaped to match the second engaging portion for forming the first alignment accuracy to ensure the central axis is coaxial with the optical axis.

Figure 11:
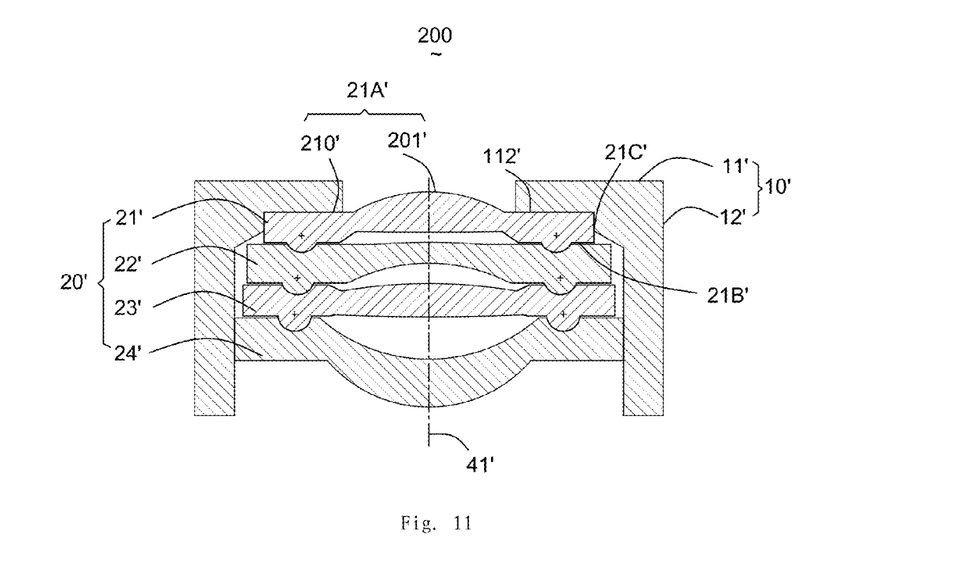
FIG. 11 is an illustrative cross-sectional view of a lens module in accordance with a second exemplary embodiment of the present disclosure.

Therefore, as shown in FIG. 11, a second embodiment, which is similar to the first embodiment of the present invention, is illustrated in FIG. 11. Referring to FIG. 11, a lens module 200 comprises a lens supporter 10' with a central axis 41' and a lens group 20' supported by the lens supporter 10'. The lens group 20' has an optical axis 41. The lens group 20' has a first lens 21', a second lens 22' stacked on the first lens 21', a third lens 23' stacked on the second lens 22', and a fourth lens 24' stacked on the third lens 23'. The lens supporter 10' has a aperture plate 11' and a main body 12' extending vertically from an edge of the aperture plate 11'. The aperture plate 11' has a first bottom surface 112' directly abutting against the first lens 21'. The first lens 21' has a first object-side surface 21A', a first image-side surface 21B' opposite to the first object-side surface 21A', and a first lateral surface 21C' connecting the first object-side surface 21A' with the first image-side surface 21B'. The first lateral surface 21C' abuts against the main body 12'. The first image-side surface 21B' comprises a first object-side optical surface 201' in the middle thereof and centered about the optical axis 41 for serving as an optical zone, and a first object-side extending portion 210' connecting the first lateral surface 21C' with the first object-side optical surface 201'. Herein, the first object-side extending portion 210' abuts against the first bottom surface 112'. In this embodiment, a first concave part is provided on the second lens 22' and a first convex part is accordingly provided on the first lens 21', for holding the first lens 21' and the second lens 22' in a precisely coaxial relationship. In this embodiment, engagements between the other lenses are similar with that between the first lens 21' and second lens 22', for ensuring the concentricity of the lens group 20', so that the misalignment can be prevented.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising: a lens supporter, comprising an aperture plate, a main body extending downwardly from the aperture plate and a receiving space formed by the aperture plate and the main body, the aperture plate having a light aperture with a central axis, the aperture plate having a bottom surface connecting to the main body, the main body having an internal surface facing the receiving space; and a lens group with an optical axis, comprising: a first lens abutting against the aperture plate for forming a first alignment accuracy for ensuring the central axis coaxial with the optical axis, comprising a first object-side surface, a first image-side surface opposite to the first object-side surface, and a first lateral surface connecting the first object-side surface with the first image-side surface, the first lateral surface abutting against the internal surface of the main body; a second lens stacked on the first lens, comprising a second object-side surface facing the first image-side surface, a second image-side surface opposite to the second object-side surface, and a second lateral surface connecting the second object-side surface with the second image-side surface, the second lateral surface completely keeping spaced apart from the internal surface of the main body; a third lens stacked on the second lens and completely keeping spaced apart from the internal surface of the main body; and a fourth lens stacked on the third lens and abutting against the internal surface of the main body; wherein the aperture plate has a first engaging portion facing the receiving space and surrounding the central axis of the aperture plate, the first lens has a second engaging portion protruding from the first object-side surface towards the aperture plate and engaging with the first engaging portion, the first engaging portion is concave away from the first object-side surface, and the second engaging portion is a convex shape for mating the first engaging portion; the first lens further having a first concave part concave from the first image-side surface towards the first object-side surface, and the second lens further has a first convex part protruding from the second object-side surface and away from the second image-side surface for engaging with the first concave part of the first lens, for forming a second alignment accuracy for ensuring a concentricity between the first lens and the second lens, the first lens contacting with the second lens only through the second alignment; the first concave part and the first convex part both configured to be arc-shaped respectively, with an arc length of the first concave part shorter than that of the first convex part.

2. The lens module as described in claim 1, wherein the first concave part provided on the first lens is interchanged with the first convex provided on the second lens.

3. The lens module as described in claim 1, wherein the first image-side surface has a first image-side connecting portion connecting the first lateral surface and one end of the first concave part and a first image-side extending portion connecting the other end of the first concave part, and the second object-side surface has a second object-side connecting portion connecting the second lateral surface and one end of the first convex part and keeping spaced apart from the first image-side connecting portion, and a second object-side extending portion connecting the other end of the first convex part and keeping spaced apart from the first image-side extending portion.

4. The lens module as described in claim 3, wherein, the second lens further has a second concave part, and the third lens has a third object-side surface, a third image-side surface opposite to the third object-side surface, a third lateral surface keeping spaced apart from the internal surface of the main body and connecting the third object-side surface with the third image-side surface, and a second convex part protruding from the third object-side surface away from the third image-side surface for engaging with the second concave part.

5. The lens module as described in claim 3, wherein the first concave part engaging with the first convex part forms a first jointing portion having a first farthest curve far away from the first image-side surface, a first outer part extending from the first farthest curve towards the main body and a first inner part extending from the first farthest curve towards the optical axis.

6. The lens module as described in claim 3, wherein the second concave part of the second lens and the second convex part of the third lens are configured to be arc-shaped, respectively.

7. The lens module as described in claim 3, wherein the second image-side surface has a second image-side connecting portion connecting the second lateral surface and one end of the second concave part and a second image-side extending portion connecting the other end of the second concave part, and the third object-side surface has a third object-side connecting portion connecting the third lateral surface and one end of the second convex part and keeping spaced apart from the second image-side connecting portion, and a third object-side extending portion connecting the other end of the second convex part and keeping distance from the second image-side extending portion.

8. The lens module as described in claim 7, wherein the third lens further has a third concave part, and the fourth lens has a fourth object-side surface, a fourth image-side surface opposite to the fourth object-side surface, a fourth lateral surface engaging with the internal surface of the main body and connecting the fourth object-side surface with the fourth image-side surface, and a third convex part protruding from the fourth object-side surface away from the fourth image-side surface, for engaging with the third concave part.

9. The lens module as described in claim 8, wherein the third concave part of the third lens and the third convex part of the fourth lens are configured to be arc-shaped, respectively.

10. The lens module as described in claim 8, wherein the third image-side surface has a third image-side connecting portion connecting the third lateral surface and one end of the third concave part and a third image-side extending portion connecting the other end of the third concave part, and the fourth object-side surface has a fourth object-side connecting portion connecting the fourth lateral surface and one end of the third convex part and keeping distance from the third image-side connecting portion, and a fourth object-side extending portion connecting the other end of the third convex part and keeping distance from the third image-side extending portion.

11. The lens module as described in claim 10, wherein the third image-side connecting portion is configured substantially coplanar with the third image-side extending portion, and the fourth object-side connecting portion is configured substantially coplanar with the fourth object-side extending portion.

12. The lens module as described in claim 11, wherein the third concave part of the third lens and the third convex part of the fourth lens are configured to be arc-shaped, respectively, with an arc length of the third concave part shorter than that of the third convex part.

13. The lens module as described in claim 7, wherein the second image-side connecting portion is configured substantially coplanar with the second image-side extending portion, and the third object-side connecting portion is configured substantially coplanar with the third object-side extending portion.

14. The lens module as described in claim 13, wherein the second concave part of the second lens and the second convex part of the third lens are configured to be arc-shaped, respectively, with an arc length of the second concave part shorter than that of the second convex part.

15. The lens module as described in claim 3, wherein the first image-side connecting portion is configured substantially coplanar with the first image-side extending portion, and the second object-side connecting portion connecting is configured substantially coplanar with the second object-side extending portion.

16. The lens module as described in claim 1, wherein the first engaging portion and the second engaging portion are configured to be arc-shaped, respectively.

17. The lens module as described in claim 1, wherein the bottom surface of the aperture plate comprises a first bottom surface surrounding the light aperture, a second bottom surface connecting to the main body, and the first engaging portion connecting the first bottom surface with the second bottom surface and surrounding the central axis.

18. The lens module as described in claim 17, wherein the first object-side surface comprises a first object-side extending portion including a first object-side optical surface arranged in middle thereof and centered about the central axis for serving as an optical zone, and a first abutting portion connecting the first object-side optical surface with the second engaging portion, the first bottom surface abutting against the first abutting portion, the second bottom surface abutting against a first connecting portion of the first lens, the first engaging portion abutting against the second engaging portion, the first lateral surface at least partially abutting against the main body.

* * * * *